United States Patent [19]
Takagi et al.

[11] Patent Number: 6,005,535
[45] Date of Patent: Dec. 21, 1999

[54] NETWORK IMAGE-PROCESSING SYSTEM

[75] Inventors: Tsuneyoshi Takagi, Yokohama; Kenichiro Tanaka, Kawasaki, both of Japan

[73] Assignee: Canon Kabushiki Kaisha, Japan

[21] Appl. No.: 08/685,550

[22] Filed: Jul. 24, 1996

[30] Foreign Application Priority Data

Jul. 31, 1995 [JP] Japan ................................. 7-194981

[51] Int. Cl.⁶ .................................................. G06F 17/30
[52] U.S. Cl. ......................... 345/2; 345/121; 345/129; 345/341
[58] Field of Search ............................. 345/2, 123, 202, 345/121, 129, 341; 364/927.7

[56] References Cited

U.S. PATENT DOCUMENTS

| | | | |
|---|---|---|---|
| 4,465,349 | 8/1984 | Rinn et al. ................................ | 353/25 |
| 4,734,689 | 3/1988 | Kurakake ................................. | 340/726 |
| 5,241,625 | 8/1993 | Epard ....................................... | 395/163 |
| 5,528,259 | 6/1996 | Bates ........................................ | 345/121 |
| 5,777,618 | 7/1998 | Kita et al. ................................. | 345/418 |
| 5,801,677 | 9/1998 | Obata ....................................... | 345/123 |

*Primary Examiner*—Thomas G. Black
*Assistant Examiner*—William Trinh
*Attorney, Agent, or Firm*—Fitzpatrick, Cella, Harper, & Scinto

[57] ABSTRACT

When a desired field frame is specified on an area of a display in which pages connected in series are displayed in their compressed form, the data in the specified field frame is displayed in a document image display section. When the specified field frame is moved with the use of a previous-page button, a next-page button, a forward-slide button, or a backward-slide button, the data in the moved field frame is displayed in the document image display section. The information concerning the movement of the field frame is transferred to other terminals so that on the white boards of the other terminals, the same processing is performed.

21 Claims, 4 Drawing Sheets

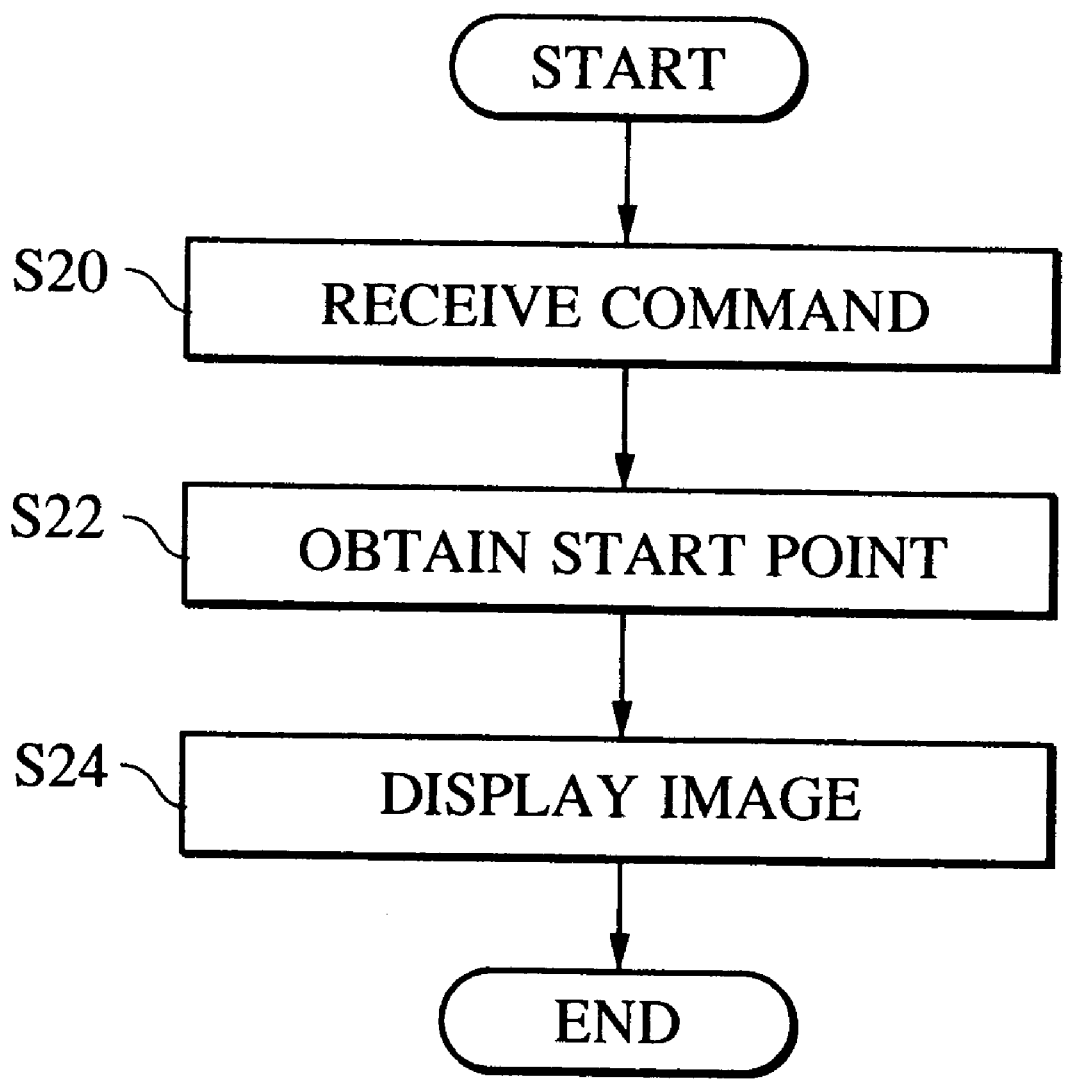

NETWORK IMAGE-PROCESSING SYSTEM

BACKGROUND OF THE INVENTION

1. Field of the Invention

The present invention relates to a network image-processing system in which the white boards respectively provided for each of a plurality of terminals connected to a network operate cooperatively with each other.

2. Description of the Related Art

In many conventional network image-processing systems, each white board cooperatively operating at a respective one of a plurality of terminals connected to a network has just a single page, and drawing is performed on that page. Even in systems in which the white board handles a plurality of pages, the pages are sequentially switched to show each page separately, and drawing is performed on each page separately.

Since, in the conventional network image-processing system, drawing is performed only page by page, when a new drawing is to be made based on a portion of a drawing on another page, it is impossible to use only the required portion by sliding the unwanted portion out of the drawing area, and instead the unwanted portion must be deleted in order to start the new drawing. Alternatively, the required portion must be copied to a new page to start the new drawing.

More specifically, an upper portion or a lower portion of the drawing area cannot be used separately, since the drawing area needs to be moved in page units. Therefore, unnecessary objects need to be deleted or the required portion needs to be copied, reducing work efficiency.

SUMMARY OF THE INVENTION

Accordingly, it is an object of the present invention to solve the foregoing problems.

Another object is to provide a network image-processing system which enables work efficiency to be improved by facilitating operations for making a new drawing based on part of a drawing already on a page.

The foregoing objects are achieved according to one aspect of the present invention through the provision of a network image-processing system including: a first terminal having a first white board for drawing an image and a first memory for storing first data, the first memory having a capacity larger than that of a display area of the first white board, and a second terminal having a second white board for drawing an image and a second memory for storing second data having the same content as the first data and having a larger capacity than that of a display area of the second white board. The first terminal further includes a first starting-point storage for storing the starting point of data to be displayed on the display area of the first white board from among the first data stored in the first memory, a first starting-point change-direction circuit for directing a change of the starting point stored in the first starting-point storage to a desired point, a starting-point calculation circuit for calculating the changed starting point in the first data according to the direction of a change of the starting point by the first starting-point change-direction circuit, a first starting-point change circuit for changing the starting point stored in the starting-point storage means according to the starting point calculated by the starting-point calculation circuit, and a reporting device for reporting, to the second terminal, the starting point calculated by the starting-point calculation circuit. The second terminal further includes a second starting-point storage for storing the starting point of data to be displayed on the display area of the second white board from among the second data stored in the second memory, a receiving device for receiving the starting point reported from the first terminal by the reporting device, and a second starting-point change circuit for changing the starting point stored in the second starting-point storage according to the starting point received by the receiving device.

BRIEF DESCRIPTION OF THE DRAWINGS

FIG. 4 is a flowchart showing the procedure for moving the data displayed on the display area with a starting-point move command received from another terminal.

DETAILED DESCRIPTION OF THE PREFERRED EMBODIMENT

Figure 1:
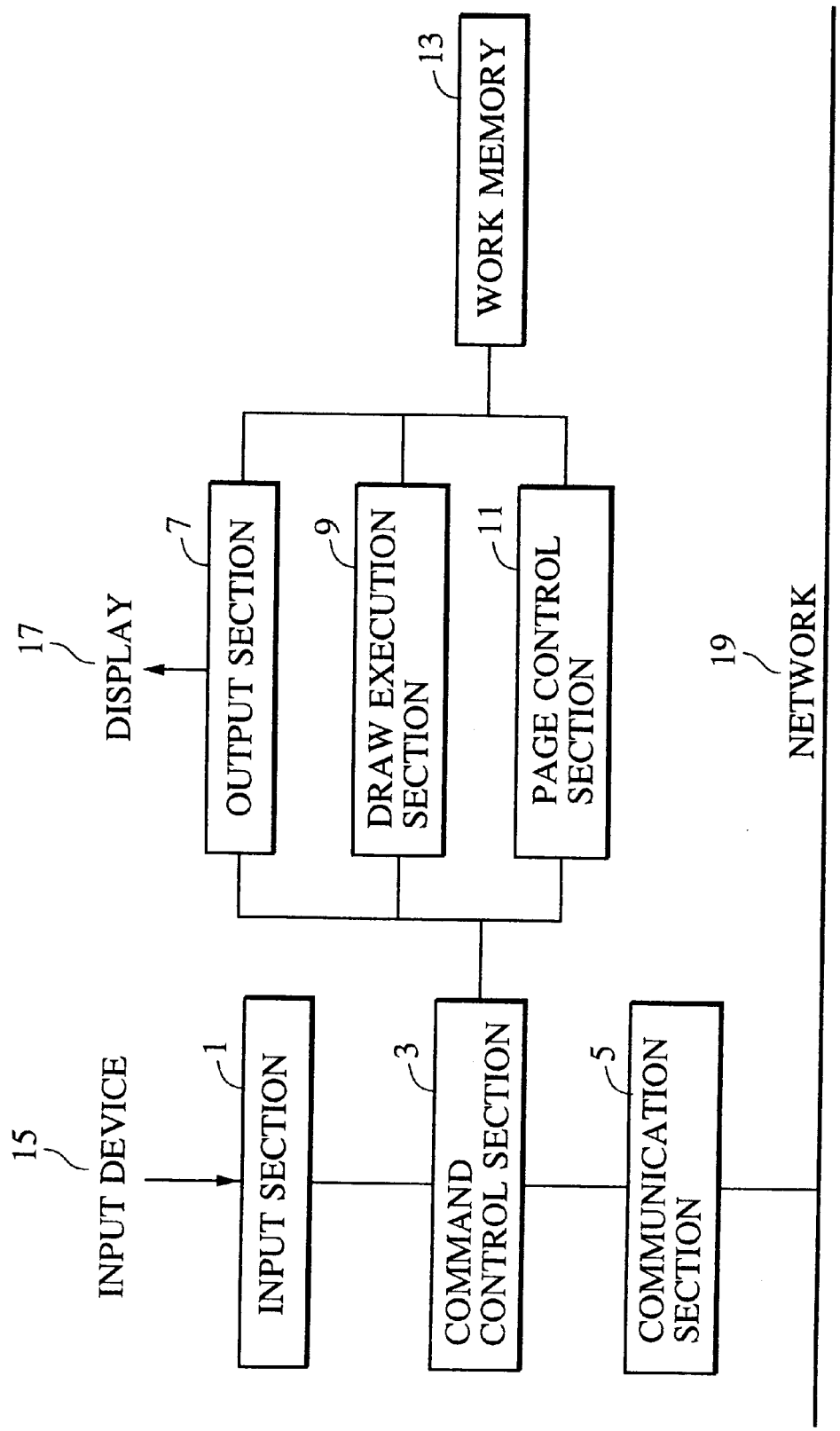
FIG. 1 is a block diagram showing a configuration of a white board according to an embodiment of the present invention.

An embodiment of the present invention will be described below in detail by referring to the drawings.

FIG. 1 is a block diagram showing the configuration of a white board according to an embodiment of the present invention.

In FIG. 1, an input section 1 obtains an input from an input device 15 such as a keyboard or a mouse, and an output section 7 outputs data to a display 17. A communication section 5 is connected to a network 19 and conducts communications with other shared white boards connected to the network. A command control section 3 analyzes a command input from the input section 1 or the communication section 5, transfers an instruction to each processing section, and transmits a command generated by each processing section to the other shared white boards through the communication section 5. A draw execution section 9 actually executes the drawing functions of the white board, such as figure generation and character inputs. A page control section 11 controls the position of an area to be actually displayed among the areas of a plurality of pages. Working memory 13 is used by the white board.

In this embodiment, a plurality of white boards as shown in FIG. 1 are connected through a network to enable cooperative operations to be performed by mutual communications.

Figure 2:
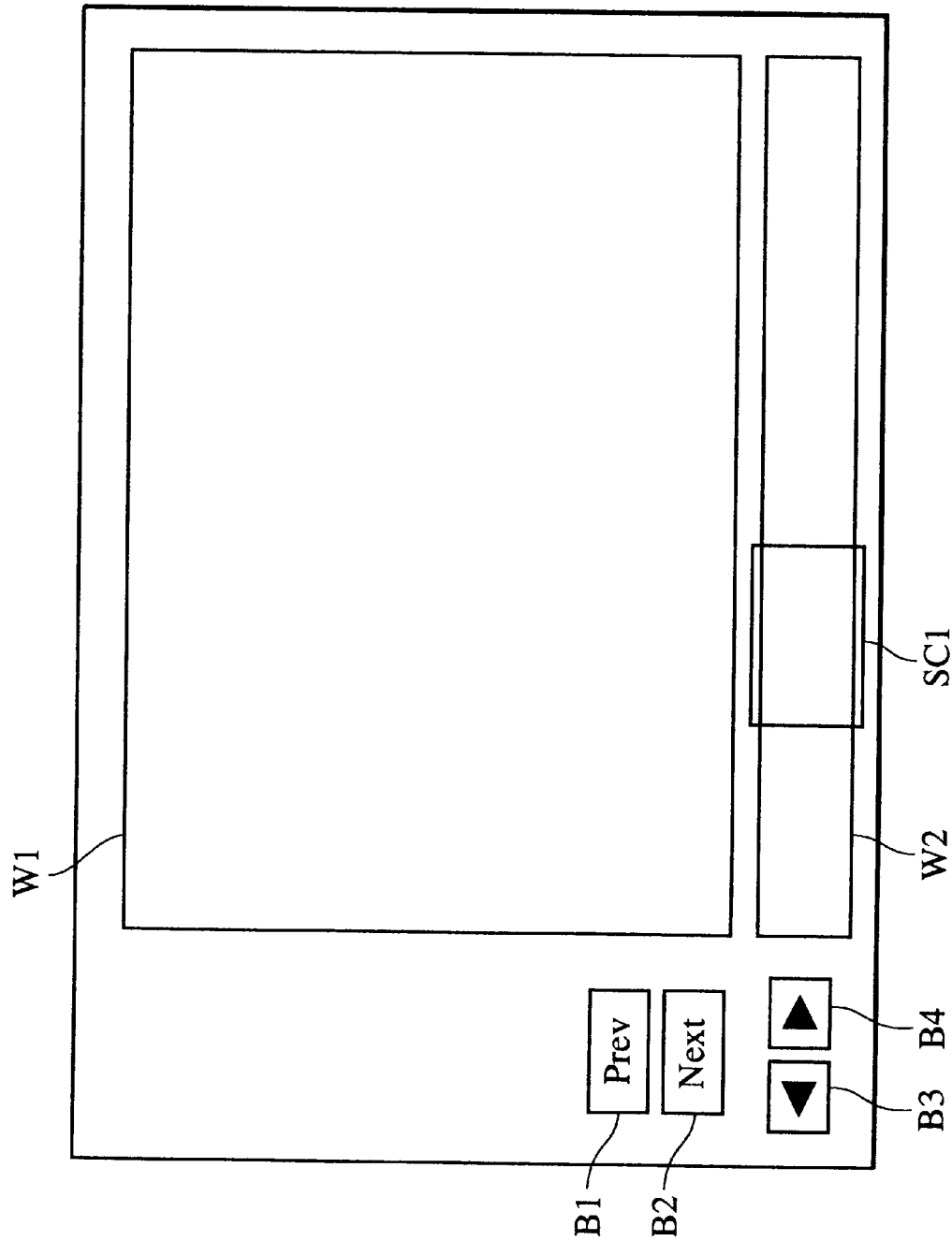
FIG. 2 is a view illustrating an outlined screen of the white board according to the embodiment of the present invention.

FIG. 2 is a view illustrating an outlined screen of the white board according to the embodiment of the present invention In FIG. 2, there is shown a document-image display area W1 for which drawing operations are performed. A key B1 is used for displaying the data of the page shown immediately prior to the page currently displayed on the display area when the page currently shown on the display area does not contain data from more than one page as stored in memory, and is used for displaying the data of the page from the beginning when the page currently shown on the display area contains data from more than one stored page. A key B2 is used for displaying the data of the page immediately after the page currently displayed on the display area when the page currently shown on the display area does not contain data from more than one stored page, and is used for displaying the data of the latter page from the beginning when the page currently shown on the display area contains data from more than one stored page. A key B3 is used for sliding the displayed data in the forward direction. The distance of the slide is determined by, for example, the time period during which this key B3 is pressed. The longer the key is pressed, the greater is the distance of the slide. A key B4 is used for sliding the displayed data in the backward direction in a corresponding fashion.

As described above, the displayed data is moved in page units with the keys B1 and B2 or is slid with the keys B3 and B4.

An area W2 shows the compressed data of whole pages connected in series. The width of the area W2 is a multiple of the width of the compressed data of whole pages. In the area W2, a field frame SC1 indicates the area presently displayed on the display area W1. In other words, the data corresponding to SC1 is displayed in the area W1.

With the key B1, B2, B3, or B4 being pressed, SC1 moves within W2 and the corresponding image is displayed in W1.

The movement of SC1 may also be readily implemented by operating an arrow key or the like on the keyboard or by grasping SC1 by the mouse to drag it.

Figure 3:
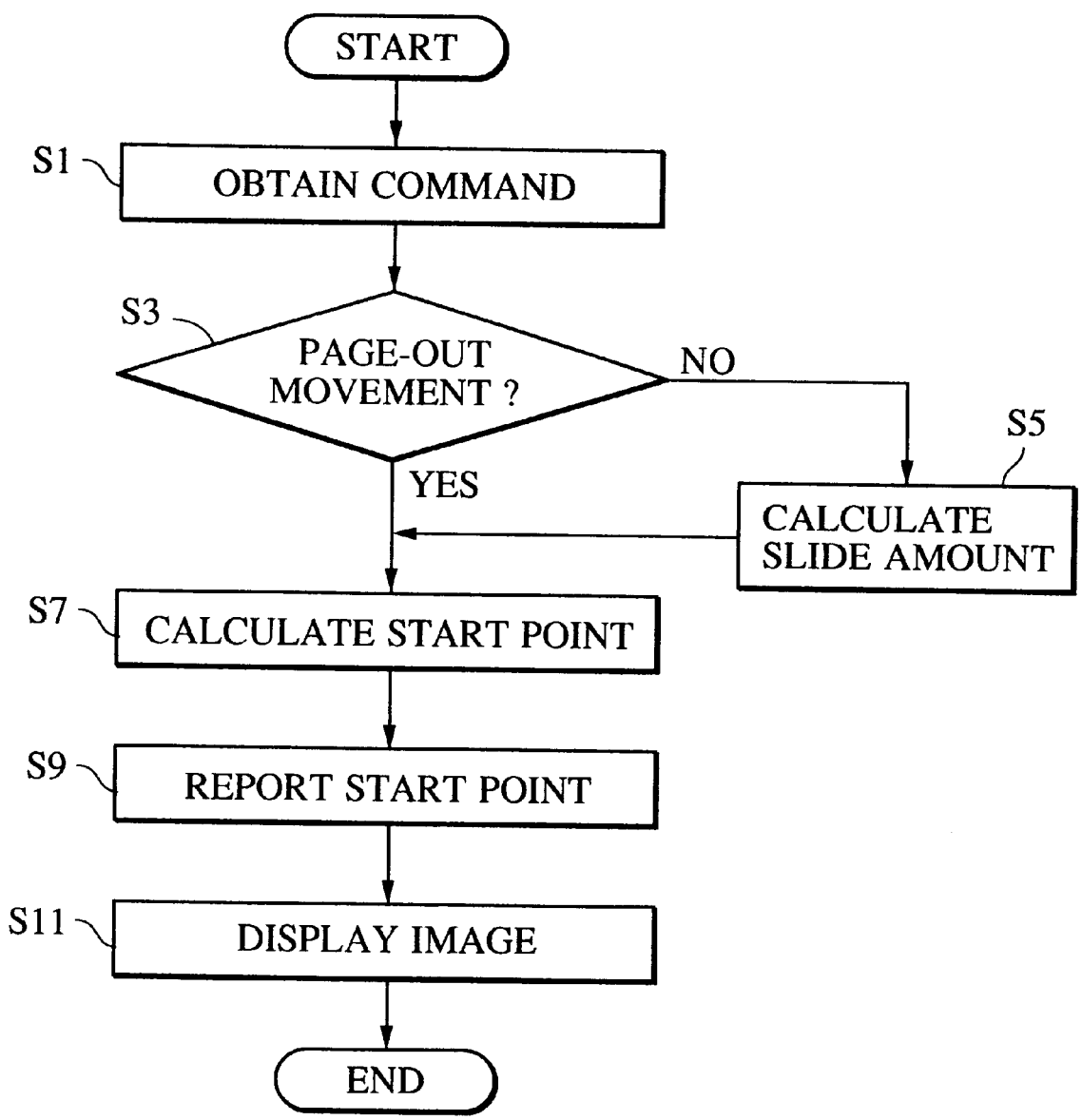
FIG. 3 is a flowchart showing the procedure for moving the data displayed on the display area with a command input from an input section.

FIG. 3 is a flowchart showing the procedure for moving the displayed data with a command input from the input section 1.

In FIG. 3, the command input from the input section 1 is obtained in step S1. The obtained command is either a command for sliding the displayed data or a command for showing data of another page from the beginning.

In step S3, the type of command obtained in step S1 is determined. When the displayed data is to be slid, step S5 is performed. When data of another page is to be displayed from the beginning, step S7 is performed.

In step S5, the distance that the displayed data is to be slid is calculated from a value specified in the command or from an argument. A value given by the command corresponds, for example, to the time period during which a key such as B3 or B4 is pressed for movement, or to the time period during which a button on a mouse is pressed. In this embodiment, the longer the time period the key or button is being pressed, the further the displayed data is slid. The absolute value of the amount of movement on the display area is large compared to the size of a page.

In step S7, the display starting point is calculated. When movement is specified in page units in step S3, the display starting point corresponding to the page of data to be displayed is obtained. For example, it can be obtained by the calculation: (one-page length)×(page number of the data to be displayed−1). When a sliding movement is specified in step S3, the display starting point is calculated by adding the amount of movement calculated in step S5 to the beginning point of the data currently displayed. The page control section 11 conducts the foregoing processing from steps S1 to S7. The display starting point obtained in step S7 is written into a starting-point storage area in the working memory 13.

In step S9, a starting-point-move command is transmitted in order to report the display starting point obtained in step S7 to other shared white boards. The page control section 11 generates a starting-point-move command and sends it to the command control section 3. The command control section 3, which receives the starting-point-move command, transmits the command to the network through the communication section 5.

In step S11, the output section 7 displays the specified image according to the display starting point written in the working memory 13.

FIG. 4 is a flowchart showing the procedure for moving the displayed data with a starting-point-move command received from another terminal.

In FIG. 4, the communication section 5 receives the starting-point-move command sent from another terminal in step S20. The received starting-point-move command is transferred to the command control section 3, and the page control section 11 executes the command.

In step S22, the display starting point is taken out of the starting-point-move command received in step S20, and is written into the starting-point storage area in the working memory 13.

In step S24, the output section 7 displays the specified image according to the starting point written in the working memory 13.

As described above, according to the processing in this embodiment, data to be displayed is moved in page units, or is slid, among pages connected in series.

In the above embodiment of the present invention, data to be displayed is selected from pages connected transversely. The same apparatus can be easily modified to select data to be displayed from pages connected longitudinally and to display the specified data. By combining transverse and longitudinal movement, the data to be displayed can be easily selected to move transversely and longitudinally with the use of the same apparatus.

This invention can be applied to one apparatus and also to a plurality of apparatuses connected to a network. It can also be applied to a workstation in which an appropriate program is installed.

As described above, according to the present invention, when a change is directed in a specified area on the data displayed on a first white board in a first terminal, the data area to be displayed on the first white board is calculated according to the direction, the specified area on the first white board is changed according to the calculation result, and the changed data is displayed on the first white board. In addition, the calculation result is reported from the first terminal to a second terminal, and the same processing is performed for a second white board in the second terminal.

Image processing can therefore be performed as if a single white board were being shared between different terminals. Furthermore, since the specified areas of the data displayed on the first and second white boards can be changed as desired, the areas of the data displayed on both white boards can be changed partially, the change not being limited to that in page units. When a new drawing is made using part of a drawing previously made, the specified area can be changed to leave only the portion to be re-used. Thus, any new drawing operations which require the use of a part of a drawing executed previously are facilitated, and work efficiency can be greatly improved.

When a change is directed in the specified area in the data displayed on the first white board in the first terminal, the starting point of the data area to be displayed on the first white board is calculated according to such direction, and only the starting-point-change command based on the calculation result is sent to the second white board in the second terminal to change the displayed data on the second white board. Therefore, memory shared by the first and second terminals is not necessary, and communications between the first and second terminals are reduced.

What is claimed is:

1. An image processing apparatus comprising:

a display apparatus having an image display area wherein a first image is displayed and a symbol display area wherein a symbol is displayed, the symbol representing part of a whole image and the part corresponding to the first image displayed in said image display area, a display control apparatus for compressing the whole image to a compressed image that is a smaller version of the whole image and for displaying the part of the compressed image corresponding to the first image as the symbol within said symbol display area, an instruction apparatus for instructing a change as to which part of the first image is represented by the symbol as a move of the symbol; and a move control apparatus for controlling the move of the symbol according to the instruction by said instruction apparatus, and for controlling the first image displayed in said image display area in accordance with the move.

2. An apparatus according to claim 1, wherein the symbol is a frame.

3. An apparatus according to claim 2, wherein a width of the frame is wider than a width of said symbol display area.

4. An image processing system having a first image processing apparatus and a second image processing apparatus connected on a network, said first image processing apparatus and said second image processing apparatus each respectively comprising:

a display apparatus having an image display area wherein a first image is displayed and a symbol display area wherein a symbol is displayed, the symbol representing part of a whole image and the part corresponding to the first image displayed in said image display area, p1 a display control apparatus for compressing the whole image to a compressed image that is a smaller version of the whole image and for displaying the part of the compressed image corresponding to the first image as the symbol within said symbol display area, an instruction apparatus for instructing a change as to which part of the first image is represented by the symbol as a move of the symbol; and a move control apparatus for controlling the move of the symbol according to the instruction by said instruction apparatus, and for controlling the first image displayed in said image display area in accordance with the move.

5. A system according to claim 4, wherein the symbol is a frame.

6. A system according to claim 5, wherein a width of the frame is wider than a width of said symbol display area.

7. A system according to claim 4, wherein the first image displayed in said image display area of said first image processing apparatus is controlled in accordance with the move instructed by said instruction means of said second image processing apparatus.

8. A method of controlling an image processing apparatus that includes a display apparatus having an image display area wherein a first image is displayed and a symbol display area wherein a symbol is displayed, the symbol representing part of a whole image and the part corresponding to the first image displayed in the image display area, said method comprising the steps of:

a display control step of compressing the whole image to a compressed image that is a smaller version of the whole image and of displaying the part of the compressed image corresponding to the first image as the symbol within the symbol display area, an instruction step of instructing a change as to which part of the first image is represented by the symbol as a move of the symbol; and a move control step of controlling the move of the symbol according to the instruction in said instruction step, and for controlling the first image displayed in the image display area in accordance with the move.

9. A method according to claim 8, wherein the symbol is a frame.

10. A method according to claim 9, wherein a width of the frame is wider than a width of the symbol display area.

11. A method of controlling an image processing system having a first image processing apparatus and a second image processing apparatus connected on a network, the first image processing apparatus and the second image processing apparatus each respectively including a display apparatus having an image display area wherein a first image is displayed and a symbol display area wherein a symbol is displayed, the symbol representing part of a whole image and the part corresponding to the first image displayed in the image display area, said method comprising the steps of, in each of the first and second image processing apparatuses:

a display control step of compressing the whole image to a compressed image that is a smaller version of the whole image and of displaying the part of the compressed image corresponding to the first image as the symbol within the symbol display area, an instruction step of instructing a change as to which part of the first image is represented by the symbol as a move of the symbol; and a move control step of controlling the move of the symbol according to the instruction in said instruction step, and for controlling the first image displayed in the image display area in accordance with the move.

12. A method according to claim 11, wherein the symbol is a frame.

13. A method according to claim 12, wherein a width of the frame is wider than a width of the symbol display area.

14. A method according to claim 11, wherein the first image displayed in the image display area of the first image processing apparatus is controlled in accordance with the move instructed in said instruction step of the second image processing apparatus.

15. A computer readable storage medium that stores codes for executing a method of controlling an image processing apparatus that includes a display apparatus having an image display area wherein a first image is displayed and a symbol display area wherein a symbol is displayed, the symbol representing part of a whole image and the part corresponding to the first image displayed in the image display area, said method comprising the steps of:

a display control step of compressing the whole image to a compressed image that is a smaller version of the whole image and of displaying the part of the compressed image corresponding to the first image as the symbol within the symbol display area, an instruction step of instructing a change as to which part of the first image is represented by the symbol as a move of the symbol; and a move control step of controlling the move of the symbol according to the instruction in said instruction step, and for controlling the first image displayed in the image display area in accordance with the move.

16. A medium according to claim 15, wherein the symbol is a frame.

17. A medium according to claim 16, wherein a width of the frame is wider than a width of the symbol display area.

18. A computer readable storage medium that stores codes for executing a method of controlling an image processing system having a first image processing apparatus and a second image processing apparatus connected on a network, the first image processing apparatus and the second image processing apparatus each respectively including a display apparatus having an image display area wherein a first image is displayed and a symbol display area wherein a symbol is displayed, the symbol representing part of a whole image and the part corresponding to the first image displayed in the image display area, said method comprising the steps of, in each of the first and second image processing apparatuses:

a display control step of compressing the whole image to a compressed image that is a smaller version of the whole image and of displaying the part of the compressed image corresponding to the first image as the symbol within the symbol display area, an instruction step of instructing a change as to which part of the first image is represented by the symbol as a move of the symbol; and a move control step of controlling the move of the symbol according to the instruction in said instruction step, and for controlling the first image displayed in the image display area in accordance with the move.

19. A medium according to claim 18, wherein the symbol is a frame.

20. A medium according to claim 19, wherein a width of the frame is wider than a width of the symbol display area.

21. A medium according to claim 18, wherein the first image displayed in the image display area of the first image processing apparatus is controlled in accordance with the move instructed in said instruction step of the second image processing apparatus.

\* \* \* \* \*

UNITED STATES PATENT AND TRADEMARK OFFICE
CERTIFICATE OF CORRECTION

PATENT NO. : 6,005,535

DATED : December 21, 1999

INVENTOR(S) : TSUNEYOSHI TAKAGI ET AL.

It is certified that error appears in the above-identified patent and that said Letters Patent is hereby corrected as shown below:

On the title page, item

[73] ASSIGNEE

"Canon Kabushiki Kaisha, Japan" should read
--Canon Kabushiki Kaisha, Tokyo, Japan--.

COLUMN 2

Line 54, "invention" should read --invention.--

COLUMN 5

Line 33, "pl a" should read --¶ a--.

Signed and Sealed this

Fifteenth Day of August, 2000

Attest:

Q. TODD DICKINSON

*Attesting Officer*    *Director of Patents and Trademarks*